(12) United States Patent
Lou et al.

(10) Patent No.: US 8,140,734 B2
(45) Date of Patent: ***Mar. 20, 2012

(54) ASYNCHRONOUS/SYNCHRONOUS SWITCHING OF CONSOLE DEVICES AND PERIPHERAL DEVICES

(75) Inventors: Tony Lou, Taipei (TW); Kevin Chen, Taipei (TW); Sampson Yang, Irvine, CA (US)

(73) Assignee: Aten Technology Inc., Irvine, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 12/341,717

(22) Filed: Dec. 22, 2008

(65) Prior Publication Data

US 2009/0106477 A1 Apr. 23, 2009

Related U.S. Application Data

(63) Continuation of application No. 11/727,333, filed on Mar. 26, 2007, now Pat. No. 7,472,217, which is a continuation of application No. 11/204,036, filed on Aug. 16, 2005, now Pat. No. 7,340,556, which is a continuation of application No. 10/065,375, filed on Oct. 10, 2002, now Pat. No. 6,957,287.

(60) Provisional application No. 60/338,071, filed on Nov. 9, 2001.

(51) Int. Cl.
*G06F 13/00* (2006.01)
(52) U.S. Cl. ............. 710/316; 710/72; 710/317; 710/64
(58) Field of Classification Search .......... 710/305–317, 710/62–64, 72–73, 8–19; 709/227–232
See application file for complete search history.

(56) References Cited

U.S. PATENT DOCUMENTS

| 4,866,667 | A | 9/1989 | Shimada |
| 5,581,709 | A | 12/1996 | Ito et al. |
| 5,638,521 | A | 6/1997 | Buchala et al. |
| 5,721,842 | A | 2/1998 | Beasley et al. |

(Continued)

FOREIGN PATENT DOCUMENTS

CN 1310402 A 8/2001

(Continued)

OTHER PUBLICATIONS

Petition for invalidation of TW Patent No. 589539, submitted to the Taiwan Intellectual Property Office by Tangtop Technology, Mar. 2, 2006 and Mar. 31, 2006 (18 pages).

(Continued)

*Primary Examiner* — Raymond Phan
(74) *Attorney, Agent, or Firm* — Chen Yoshimura LLP

(57) ABSTRACT

A signal switch for sharing a video monitor, a plurality of console devices compliant with an industry standard and one or more than one peripheral device in any of a plurality of computer systems, is provided comprising a CPU with a first memory for storing a management program for managing the signal switch; a hub switch module connected to the CPU and configured to communicate with any of the plurality of computer systems, and the one or more than one peripheral device; a device control module for emulating according to the industry standard the plurality of console devices, connected to the CPU and the hub switch module; a host control module connected to the CPU and configured to communicate with the plurality of console devices; and a video control module connected to the CPU and configured to communicate with a video monitor device.

27 Claims, 5 Drawing Sheets

U.S. PATENT DOCUMENTS

| | | | |
|---|---|---|---|
| 5,732,212 | A | 3/1998 | Perholtz et al. |
| 5,754,881 | A | 5/1998 | Aas |
| 5,841,424 | A | 11/1998 | Kikinis |
| 5,884,096 | A | 3/1999 | Beasley et al. |
| 5,982,614 | A | 11/1999 | Reid |
| 6,035,345 | A | 3/2000 | Lee |
| 6,073,188 | A | 6/2000 | Fleming |
| 6,105,143 | A | 8/2000 | Kim |
| 6,131,135 | A | 10/2000 | Abramson et al. |
| 6,141,704 | A | 10/2000 | Huang |
| 6,141,719 | A | 10/2000 | Rafferty et al. |
| 6,185,643 | B1 | 2/2001 | Kirshtein et al. |
| 6,192,423 | B1 | 2/2001 | Graf |
| 6,240,472 | B1 | 5/2001 | Hu |
| 6,256,014 | B1 | 7/2001 | Thomas et al. |
| 6,263,374 | B1 | 7/2001 | Olnowich et al. |
| 6,263,392 | B1 | 7/2001 | McCauley |
| 6,295,570 | B1 | 9/2001 | Clemens et al. |
| 6,304,895 | B1 | 10/2001 | Schneider et al. |
| 6,308,239 | B1 | 10/2001 | Osakada et al. |
| 6,314,479 | B1 | 11/2001 | Frederick et al. |
| 6,324,605 | B1 | 11/2001 | Rafferty et al. |
| 6,329,616 | B1 | 12/2001 | Lee |
| 6,373,500 | B1 | 4/2002 | Daniels |
| 6,378,009 | B1 | 4/2002 | Pinkston, II et al. |
| 6,498,890 | B1 | 12/2002 | Kimminau |
| 6,532,512 | B1 | 3/2003 | Torii et al. |
| 6,549,966 | B1 | 4/2003 | Dickens et al. |
| 6,557,170 | B1 | 4/2003 | Wilder et al. |
| 6,567,839 | B1 | 5/2003 | Borkenhagen et al. |
| 6,578,089 | B1 | 6/2003 | Simpson et al. |
| 6,600,739 | B1 | 7/2003 | Evans et al. |
| 6,615,272 | B1 | 9/2003 | Ambrose |
| 6,633,905 | B1 | 10/2003 | Anderson et al. |
| 6,671,756 | B1 | 12/2003 | Thomas et al. |
| 6,681,250 | B1 | 1/2004 | Thomas et al. |
| 6,697,905 | B1 | 2/2004 | Bealkowski |
| 6,715,010 | B2 | 3/2004 | Kumata |
| 6,901,455 | B2 | 5/2005 | Gough |
| 6,957,287 | B2 | 10/2005 | Lou et al. |
| 7,035,112 | B2 | 4/2006 | Chen |
| 7,047,331 | B2 | 5/2006 | Dickens |
| 7,102,691 | B2 | 9/2006 | Dischert et al. |
| 7,330,919 | B2 | 2/2008 | Zhang et al. |
| 7,472,217 | B2 * | 12/2008 | Lou et al. ............... 710/316 |
| 7,542,299 | B2 | 6/2009 | Chen |
| 7,613,854 | B2 | 11/2009 | Chen |
| 2001/0023141 | A1 | 9/2001 | Chang |
| 2001/0053627 | A1 | 12/2001 | Armistead et al. |
| 2002/0091850 | A1 | 7/2002 | Perholtz et al. |
| 2003/0005186 | A1 | 1/2003 | Gough |
| 2003/0030660 | A1 | 2/2003 | Dischert et al. |
| 2004/0001323 | A1 | 1/2004 | Chen |
| 2005/0275641 | A1 | 12/2005 | Franz |
| 2006/0253639 | A1 | 11/2006 | Lee et al. |

FOREIGN PATENT DOCUMENTS

| | | | |
|---|---|---|---|
| GB | 2 350 212 | A | 11/2000 |
| GB | 2350212 | A | 11/2000 |
| GB | 2352540 | A | 1/2001 |
| JP | S63-293628 | A | 11/1988 |
| JP | 02-148157 | A | 6/1990 |
| JP | H06-332836 | A | 12/1994 |
| JP | 7-58457 | | 3/1995 |
| JP | H07-104901 | A | 4/1995 |
| JP | 9-55515 | | 2/1997 |
| JP | 10-187303 | A | 7/1998 |
| JP | 11-085338 | A | 3/1999 |
| JP | 2000-196648 | A | 7/2000 |
| JP | 2000-242377 | A | 9/2000 |
| JP | 2000-255047 | A | 9/2000 |
| JP | 2000-0073385 | | 12/2000 |
| JP | 2001-043178 | A | 2/2001 |
| JP | 2001051939 | A | 2/2001 |
| JP | 2001-229119 | A | 8/2001 |
| JP | 2001-256172 | A | 9/2001 |
| JP | 2001-282701 | A | 10/2001 |
| TW | 323833 | | 12/1997 |
| TW | 386215 | A | 3/1998 |
| TW | 372289 | | 10/1999 |
| TW | 406241 | B | 9/2000 |
| TW | 459193 | B | 10/2001 |
| TW | 459197 | B | 10/2001 |
| WO | 00-68813 | | 11/2000 |
| WO | 00/68813 | A1 | 11/2000 |

OTHER PUBLICATIONS

EMC Test Report of certain USB KVM Switch manufactured by Tangtop Technology Co., Ltd. (Report No. E900581), by PEP Testing Laboratory, Oct. 29, 2001.

Petition for invalidation of TW Patent No. 589539, submitted to the Taiwan Intellectual Property Office by Mr. Jiang Cong-Shiu, Jun. 6, 2006. (28 pages).

Custom declaration forms and invoices, dated from Apr. 3, 2001 to Nov. 2001. (7 pages).

Computer printouts regarding sales of Shu-chan's USB Console, date unknown. (8 pages).

Universal Serial Bus Console Owner's Manual, Topshine Electronics Corp., 2000.

Universal Serial Bus (USB), Version 1.11.

Office Action by the Japanese Patent Office (JPO) in the counterpart Japanese application No. JP2007-052277, Feb. 18, 2008.

Brief submitted to the Taiwan Intellectual Property Office by a third party in an invalidity proceeding against Taiwan Patent No. 589539, dated Apr. 25, 2005.

International Search Report and Written Opinion in counterpart PCT application No. PCT/US2007/067716, dated Aug. 29, 2008.

ATEN's User's Manual for MasterView CS-142 2 port KVM Switch (1999).

ATEN User Manual for Master View CS-1004, CS-1008, CS-1016 KVM Switches (2000).

ATEN User Manual for Master View Pro CS-228 2 Console/8 Computer KVM Switch (2000).

Linksys User Guide for ProConnect Series Compact KVM Switches (1999).

StarTech.com Instruction Guide for SV211K KVM Switch (2001).

Avocent Outlook ES Series Installer/User Guide for models 140ES 180ES 280ES 1160ES 2160ES 4160ES (2001).

Cybex Commander Autoview KVM Switch and Installer/User Guide (1999).

Connect-Tek, KEYPORT Millennia Series, User Manual (1999).

Data Sheet, Altera® Verilog HDL: 16×16 Crosspoint Switch, © 1995-2010 [online] [retrieved on Apr. 18, 2011] Retrieved from the Altera website at http://www.altera.com/support/examples/verilog/ver_16x16.html.

Rextron MAV-108 [online] [retrieved on Apr. 6, 2011] Retrieved from Beijing Bottom Times Network Equipment Co., Ltd. website at http://www.bottomnt.com/kvm/mav108.htm.

Notification by Taiwan Intellectual Property Office regarding a charge of invalidity by third party in TW Application No. 091123858N01, to invite the applicant to submit claim amendments or rebuttals, issued Aug. 18, 2008.

Decision by Taiwan Taoyuan Civil Court in case No. 94-IP-15, *Aten International Co., Ltd* v. *Emine Technology Company , Ltd.*, issued Jan. 10, 2011.

USB Device Class Definition for Human Interface Devices (HID) Specification, 2001.

User's Guide of USB Console For 4 Devices, undated.

"Computer Products" magazine advertising material which revealed UH800 products, Mar. 2001.

Photo of USB Console For 4 Devices, made by Topshine Electronics Corp.

Document submitted as evidence by defendant in Case No. 94-IP-15, which is a compilation of materials purporting to establish the date of the USB Console product (referred to as UH800) made by Topshine Electronics Corp.

Press Release—New Power Reach Mini Elite KVM for Home and SOHO Users, regarding (P/N KVM-201PRME-OSD and KVM-401PRME-OSD), Sep. 13, 2000.

Connect-Tek, Inc., "Keyport Millenia Series User Manual", unknown date, Long Island City, NY.
Beijing Bottom Times Network Equipment Co. Ltd., "Model MAV108", "http://www.bottomnt.com/kvm/mav108.htm", 1 page, printed from the Internet on Apr. 6, 2011.
European Search Report in a counterpart application EP 06020819.6, dated Mar. 16, 2011.
OmniView™ 4-Port USB KVM Switch User Guide (F1D104-USB), Belkin, 2000.
Press Release, New Power Reach Mini Elite KVM for Home and SOHO Users, Addlogix Inc., Sep. 13, 2000.
Four Ports USB KVM Switch User's Manual (source and date not specified).
USB Monitor Control Class Specification, USB Implementers Forum, Jan. 5, 1998.
USB IEEE 1994 Solutions from Good Way—KVM Switch, Asian Sources Computer Products, Mar. 2001.
Universal Serial Bus Console Owner's Manual, Topshine Electronics Corp., 2000.
Data Communication, Coming Products—MasterView, ATEN International Co., Ltd., 2000.
Master View USB Switch CS-102U User's Manual, ATEN International Co., Ltd., 1999.
Master View USB Switch CS-104U User's Manual, ATEN International Co., Ltd., 1999.
Third party's fourth supplemental brief in Taiwan invalidity proceeding TW 91123858N03, Dec. 7, 2009.
Third party's supplemental brief in Taiwan invalidity proceeding TW 91123858N03, Mar. 21, 2008.
Third party's second supplemental brief in Taiwan invalidity proceeding TW 91123858N03, Jun. 30, 2009.
Third party's third supplemental brief in Taiwan invalidity proceeding TW 91123858N03, Jul. 13, 2009.
Third party's brief in Taiwan invalidity proceeding No. TW 91123858N04, Oct. 1, 2007.
Third party's supplemental material in Taiwan invalidity proceeding No. TW 91123858N04, Feb. 21, 2008.
"Good Way to Connect You", "Computer Products" magazine advertising materials and cover, Jun. 2001 (KS202).
User 's Manual of KVM-102UEC, Mini Compact, Two Ports USB KVM Switch.
"Belkin Omniview F1D104USB 4-Ports External KVM switch PS 2", eBay, "http://www.ebay.com/ctg/Belkin-Omniview-F1D104USB-4-Ports-External-KVM-switch-PS-2-/741232...", printed from Internet on Apr. 11, 2011.
"QVS the Connectivity Specialist", "PC Magazine", Mar. 2001 (CS-102U and CS-104U).
Product information about CS-102U and CS-104U from the ATEN's official website, printed on Jul. 1, 2009.
"PC World PC Application Magazine", the magazine cover and p. 80, Mar. 2001.
"Microcomputer Fax Magazine", the magazine cover and p. 270, Mar. 2001.
"Microcomputer Fax Magazine", the magazine cover and p. 120, Apr. 2001.
"Microcomputer Fax Magazine", the magazine cover and p. 284, Jun. 2001.
ATEN 1996 Product Guide entitled "ATEN Data Communication Knowledge Contribution Future Creation 1996".
ATEN 1997 Product Guide entitled "ATEN Connectivity Expert Data Communication Knowledge Contribution Future Creation '97".
ATEN 1998 Product Guide entitled "ATEN Connectivity Expert Data Communication Knowledge".
ATEN 1999 Product Guide entitled "ATEN Connectivity Expert Data Communication Knowledge Contribution Future Creation 99".
ATEN 2000 Product Guide entitled "ATEN Connectivity Expert 2000 Data Communication Knowledge Contribution Future Creation".
ATEN 2001 Product Guide entitled "ATEN Product Guide Master View".
ATEN 2001 Product Guide entitled "ATEN Enjoy your technology KVM, USB, FireWire & Data solutions Product Guide 2001".
ATEN 2002 Product Guide entitled "ATEN Master View KVM Switch Solutions Complete Control Product Guide 2002".
ATEN 2001 Product Guide entitled "ATEN Product Guide Data Communication Product".
ATEN User Manual for CS428 4 Console/8 Port KVM Switch.
ATEN User's Manual for Master View CS-12 2 port KVM Switch.
ATEN Packing List and User's Manual for Master View CS-142 2 port KVM Switch.
Startech SV211K KVM Switch Kit and Corresponding Instruction Guide.
Startech Press release for SV211K Rack Advisor from http://web.archive.org/web/20011212143020/www.startech.com/press_releases/sv211kpressrelease.htm [retrieved on Apr. 3, 2007].
ATEN 2001 Product Guide entitled "Product Guide Digital Connectivity".
ATEN User's Manual for Master View CS-142 2 port KVM Switch.
Defendants Belkin International, Inc. and Belkin, Inc.'s Supplemental Responses to ATEN International Co., Ltd. and ATEN Technology, Inc.'s Fifth Set of Interrogatories (No. 28), U.S. District Court, Central District of California, Southern Division, Case No. 8:09-CV-00843-(AG-MLGx); 102 pages.

* cited by examiner

ASYNCHRONOUS/SYNCHRONOUS SWITCHING OF CONSOLE DEVICES AND PERIPHERAL DEVICES

This application is a continuation of U.S. application Ser. No. 11/727,333, filed Mar. 26, 2007, now allowed, which is herein incorporated by reference in its entirety. U.S. application Ser. No. 11/727,333 is a continuation of U.S. application Ser. No. 11/204,036, filed Aug. 16, 2005, now U.S. Pat. No. 7,340,556, which is in turn a continuation of U.S. application Ser. No. 10/065,375, filed Oct. 10, 2002, now U.S. Pat. No. 6,957,287, which claims priority from U.S. Provisional Application No. 60/338,071, filed Nov. 9, 2001.

CROSS REFERENCE TO RELATED APPLICATIONS

The present Application claims the benefit of U.S. patent application Ser. No. 11/204,036 titled "Asynchronous/Synchronous Electronic USB KVMP Switch" filed Aug. 16, 2005; the contents of which are incorporated by reference in this disclosure in their entirety.

BACKGROUND OF INVENTION

A single-user or multi-user keyboard-video-mouse ("KVM") switch system is a signal switch that allows a single user or multiple users to share just a single keyboard, video device and mouse, or multiple sets of keyboards, video devices and mice.

A problem with current KVM switches is that if a USB peripheral, such as a printer, is connected to the switch, data flow is interrupted to that peripheral when the switch is changed.

Universal Serial Bus (USB) is a communications architecture that gives a personal computer (PC) the ability to interconnect a variety of devices using a simple cable. The USB is actually a two-wire serial communication link that runs at either 1.5 or 12 megabits per second (Mbps). USB protocols can configure devices at startup or when they are plugged in at run time. These devices are broken into various device classes. Each device class defines the common behavior and protocols for devices that serve similar functions.

The most current information concerning the USB standard is maintained at the following site on the World Wide Web: http://www.usb.org. Available at that source are the Universal Serial Bus (USB) Specification, the USB HID Usage Supplement, and the Device Class Definition for Human Interface Devices (HID). The HID class consists primarily of devices that are used by humans to control the operation of computer systems. Typical examples of HID class devices include: keyboards and pointing devices—for example, standard mouse devices, trackballs, and joysticks; front-panel controls—for example: knobs, switches, buttons, and sliders; controls that might be found on devices such as telephones, VCR remote controls, games or simulation devices—for example: data gloves, throttles, steering wheels, and rudder pedals; and devices that may not require human interaction but provide data in a similar format to HID class devices—for example, bar-code readers, thermometers, or voltmeters.

What is needed is a KVM switch that is also a peripheral sharing switch, which would allow all the computers connected to the switch to share any USB peripheral devices without interruption of data flow to that peripheral when the switch is changed, and which would switch the KVM channels and peripheral channels to a common computer or to different computers either asynchronously or synchronously.

SUMMARY OF INVENTION

The present invention meets this need by providing a KVM switch that is also a peripheral sharing switch, which allows all the computers connected to the switch to share any USB peripheral devices, and which can switch the KVM channels and peripheral channels to a common computer or to different computers either asynchronously or synchronously without interruption of data flow to that peripheral when the switch is changed. USB peripherals may be synchronously or asynchronously switched with the KVM channels.

The present invention, USB KVMP, allows multiple USB keyboards and multiple USB mice communicating with a common computer at the same time. The USB KVMP provides multiple USB peripheral channels to users and those channels can be connected with all kinds of USB peripherals, such as a USB hub, USB printer, USB scanner, USB camera, etc.

A signal switch is disclosed for sharing a video monitor, a plurality of console devices and one or more than one peripheral device in any of a plurality of computer systems, comprising a CPU comprising a first memory for storing a management program for managing the signal switch; a hub switch module connected to the CPU and configured to communicate with any of the plurality of computer systems, and the one or more than one peripheral device, such that a signal passing from the hub switch module to the one or more than one peripheral device emulates origination from a computer; a device control module for emulating the video monitor and plurality of console devices, connected to the CPU and the hub switch module; a host control module connected to the CPU and configured to communicate with the plurality of console devices; and a video control module connected to the CPU and configured to communicate with a video monitor device.

In a further embodiment, the signal switch further comprises an OSD control device connected to the CPU and the video control module.

In a preferred embodiment the host control module comprises a root hub, the plurality of console devices and one or more than one peripheral device are USB compliant, and the console devices comply with an industry standard specification.

A method is described for sharing a video monitor, a plurality of console devices compliant with an industry standard and one or more than one peripheral device in any of a plurality of computer systems through a signal switch, comprising: initializing the signal switch; emulating one or more of the console devices according to the industry standard; enumerating ports of a root hub; determining whether any downstream ports exists, and if so, enumerating the downstream ports; determining whether any of the plurality of console devices is connected to the root hub, or any downstream ports, and if so, then enumerating each connected device; determining whether any of the connected devices is compliant with the industry standard; enumerating each complaint connected device and parsing any data from such device; and repeatedly polling to determine whether any of the plurality of console devices, any of the one or more than one peripheral device, or any downstream port, has been plugged or unplugged, and if so, resetting control.

In one preferred embodiment, the management program comprises steps for managing the signal switch, and the described method.

A signal switch is described for sharing one or more console devices and one or more peripheral devices in any of a plurality of computer systems, comprising: a first channel for connecting a selected console device from the one or more console devices to a first selected computer system from the plurality of computer systems; a second channel connecting the first selected computer system to a selected peripheral device from the one or more peripheral devices, the second channel having a data flow between the first selected computer system and the selected peripheral device; a third channel for connecting the selected console device to a second selected computer system from the plurality of computer systems; and means for switching the selected console device between the first channel and the third channel without interruption of the data flow through the second channel between the first selected computer system and the selected peripheral device.

BRIEF DESCRIPTION OF DRAWINGS

These and other features, aspects, and advantages of the present invention will become better understood with reference to the following description, appended claims, and accompanying drawings, where:

DETAILED DESCRIPTION

The present invention is directed to a signal switch for sharing one or more than one video monitor, keyboard, mouse and peripheral device. The signal switch of the present invention is the combination of a KVM (keyboard video mouse) switch and a peripheral sharing switch. KVM switches are well known in the art with reference to this disclosure. The signal switch according to the present invention allows all computers connected to the switch to share all USB peripheral devices connected to the switch.

The signal switch can either asynchronously or synchronously switch KVM channels and peripheral channels to a common computer or different computer. In other words, the KVM channels and peripheral channels may be switched together (synchronously) or separately (asynchronously).

The present invention utilizes USB emulation programs to emulate the HID (Human Interface Devices) specification, thereby enabling a switch to communicate with the USB ports of PCs, and through USB host emulation programs, enable a switch to communicate with USB devices such as USB keyboards and USB mice, and a USB hub. In other words, the use of emulation makes a switch appear as a computer to peripheral devices, and enables the switch to communicate with USB devices or USB PCs at the same time.

Although an embodiment is described with reference to the current HID specification, it will be apparent to those skilled in the art with reference to this disclosure that the invention may be implemented with any specification for device interfacing.

Figure 1:
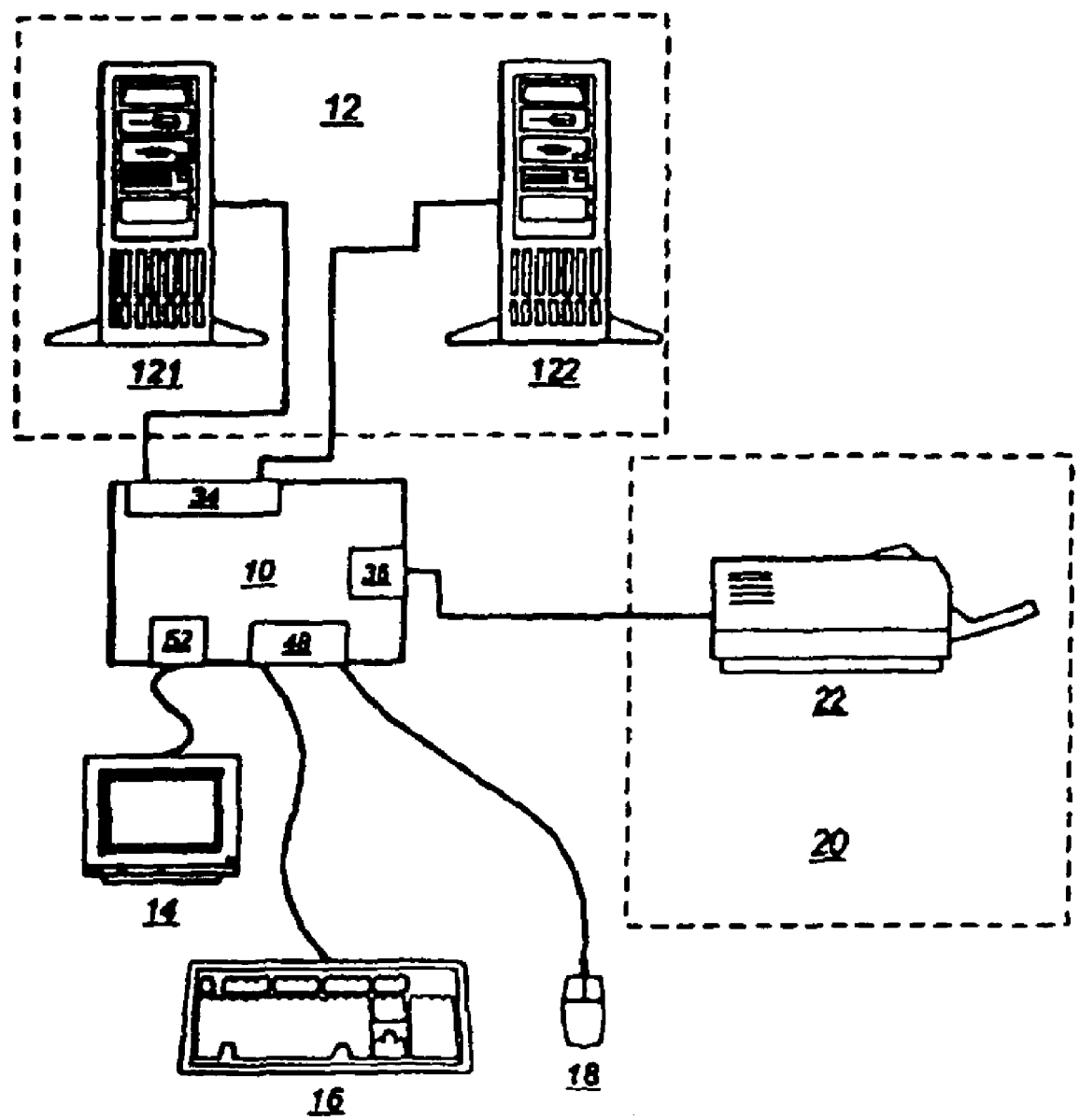
FIG. 1 is a system diagram of one possible use of the use of signal switch of FIG. 4.

FIG. 1 illustrates one of the many ways in which the present invention may be used. In a simple configuration, a signal switch 10 according to the present invention permits a user to control a plurality of computer systems 12 (represented by first computer 121 and second computer 122), and USB compatible peripherals 20 (as shown by first printer 22) with a monitor 14, first keyboard 16, and first mouse 18. In this example, control of the peripheral first printer 22 can be maintained by computer 121 even while monitor 14, first keyboard 16 and first mouse 18 are controlling computer 122. This is because switch 10 can switch between a first channel (not shown) connecting monitor 14, first keyboard 16 and first mouse 18 to first computer 121 and a third channel (not shown) connecting monitor 14, first keyboard 16 and first mouse 18 to second computer 122, while maintaining a second channel (not shown) connecting first computer 121 to first printer 22 such that a first data flow between first computer 121 and first printer 22 is not interrupted.

Figure 2:
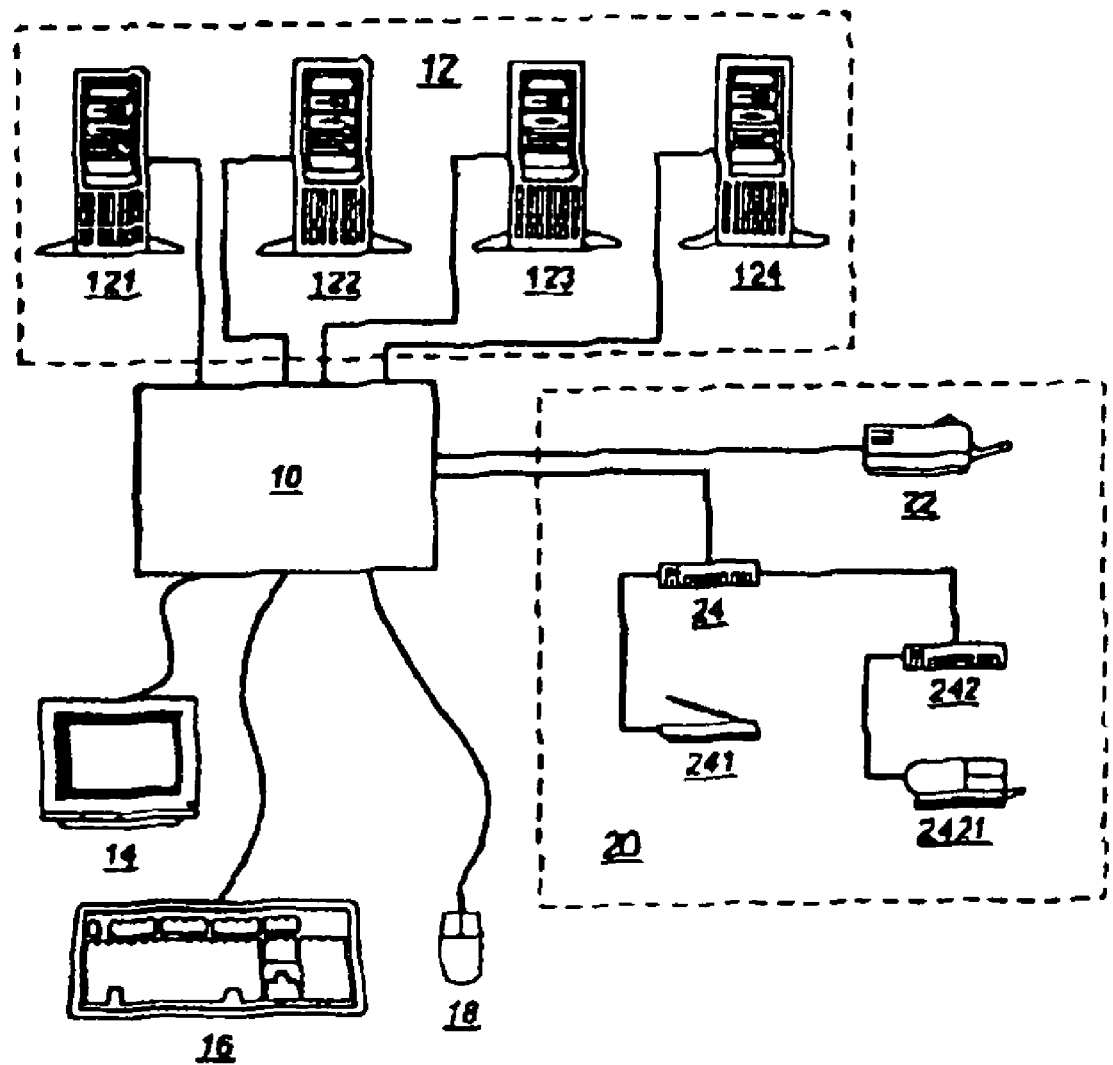
FIG. 2 is a system diagram of another possible use of the use of signal switch of FIG. 4.

With reference to FIG. 2, a more robust use is shown permitting a user to control a larger number of computer systems 12 (represented by first computer 121, second computer 122, third computer 123, and fourth computer 124), and USB compatible peripherals 20 with monitor 14, first keyboard 16, and first mouse 18. Note that with the present invention it is possible to have one or more than one USB hub 24 also connected to signal switch 10, which in turn can connect to one or more than one further peripherals such as scanner 241, or one or more than one downstream hub 242, which in turn may be connected to one or more than one peripherals such as second printer 2421. It thus can be seen that any desired tree of hubs/peripherals can be connected to signal switch 10 and thus controlled synchronously or asynchronously by the one or more than one computer systems 12 under the management of a single set of monitor 14, first keyboard 16, and first mouse 18.

Thus, for example, the first data flow between first computer 121 and first printer 22, a second data flow between third computer 123 and scanner 241, and a third data flow between fourth computer 124 and second printer 2421 all could be maintained without interruption while keyboard 16 and mouse 18, and optionally monitor 14, are switched among computer systems 12.

Peripheral devices that can be connected with the present invention include but are not limited to a USB hub, printer, scanner and camera. Other examples of peripherals will be understood by one skilled in the art with reference to this disclosure.

Figure 3:
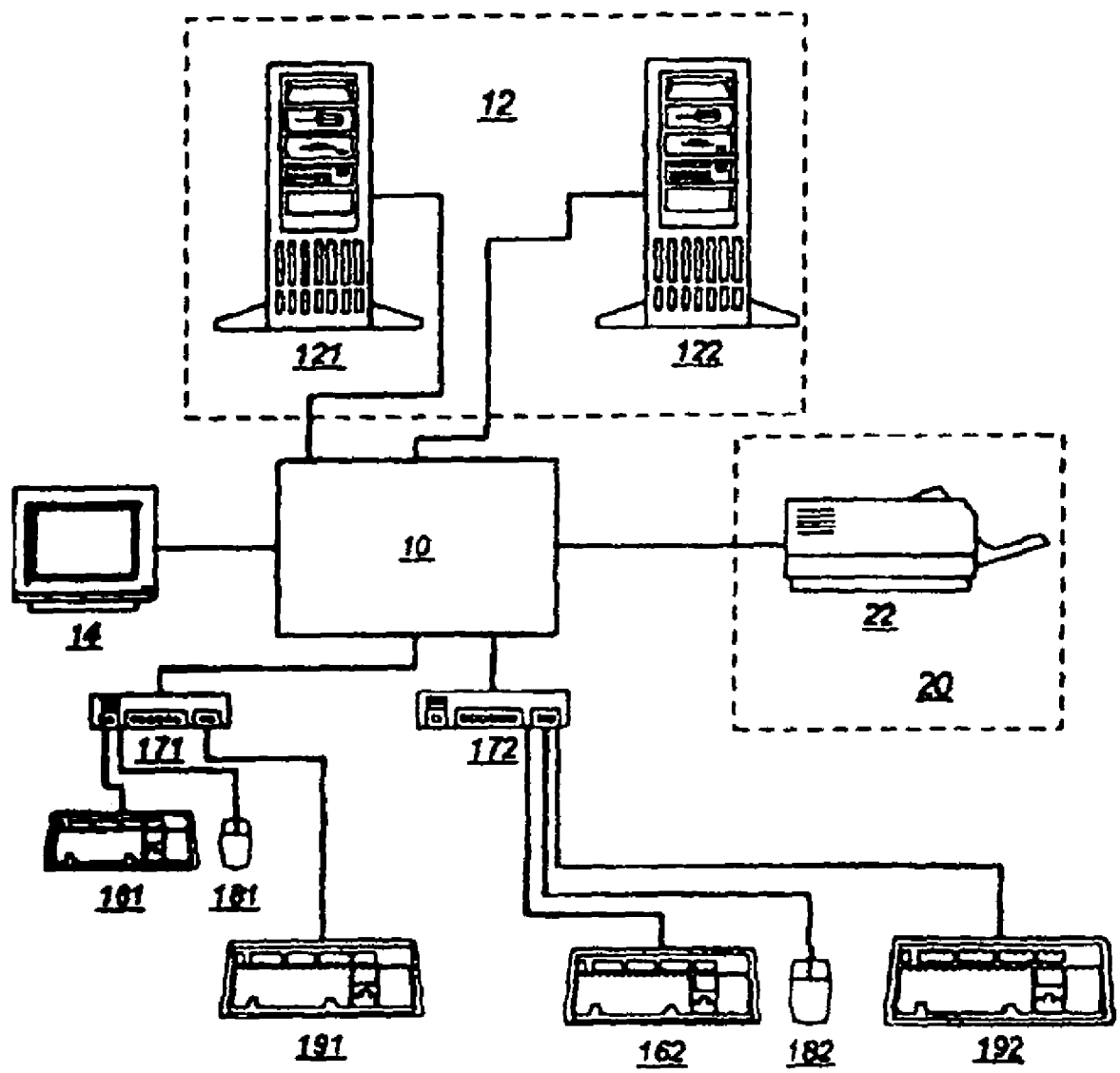
FIG. 3 is a system diagram of another possible use of the use of signal switch of FIG. 4.

With reference to FIG. 3, In a still further use of the present invention, by way of example it is possible to connect multiple KM devices such as second keyboard 161, third keyboard 162, second mouse 181, second mouse 182, first composite KM device 191 and second composite KM device 192. Preferably, since a signal switch usually only has two USB console ports, one or more than one downstream hub may be connected, such as first downstream hub 171 and second downstream hub 172, to which may be connected one or more than one KM devices.

Figure 4:
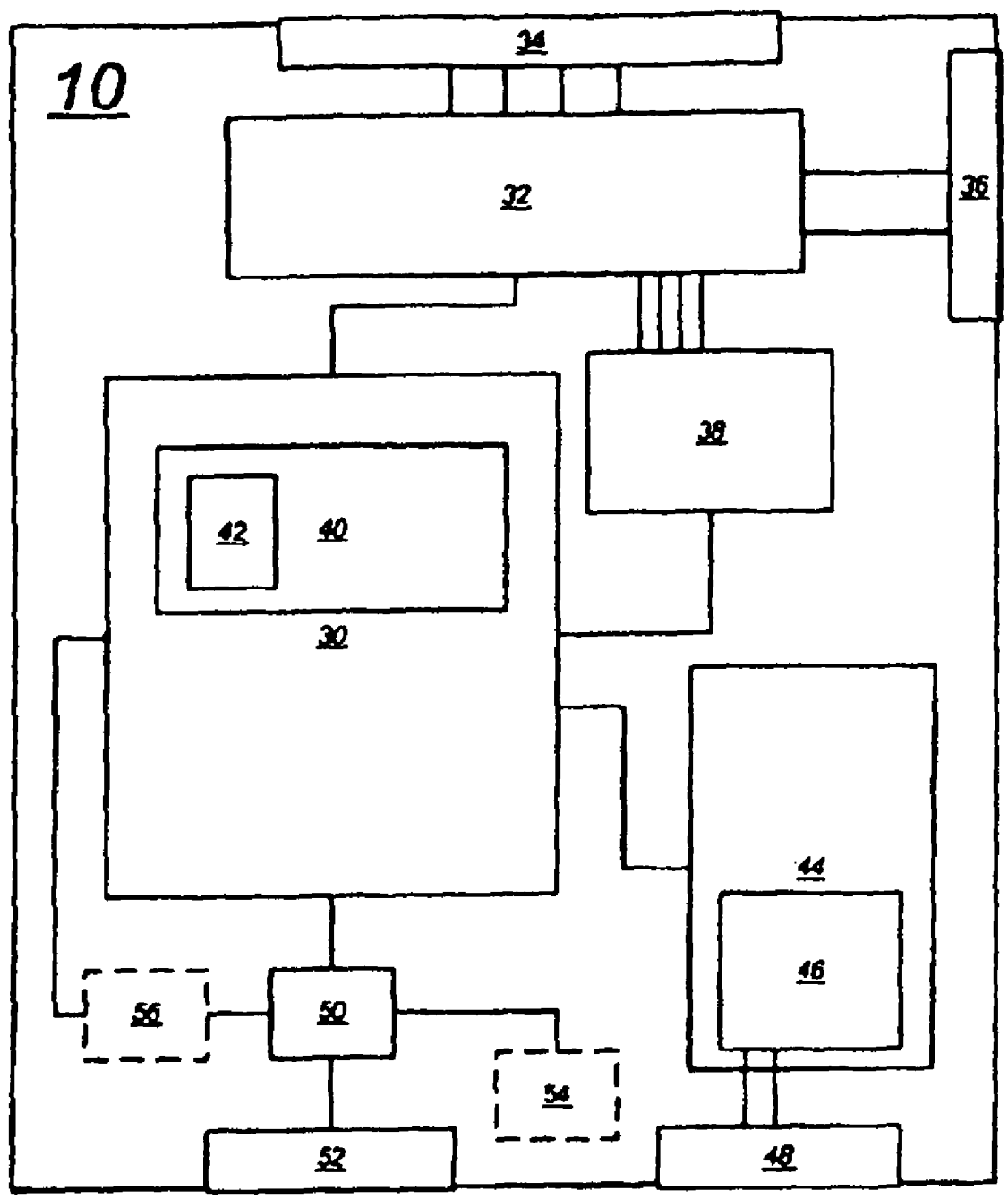
FIG. 4 is a block diagram of the signal switch of the present invention.

With reference to FIG. 4, the signal switch 10 comprises a central processing unit ("CPU") 30 for managing the signal switch 10. A USB hub switch module 32 is connected to the CPU 30 and is configured to communicate with a plurality of computer systems 12 through first output ports 34. The USB hub switch module 32 is also configured to communicate with peripheral devices 20 through output ports 36. In FIG. 4, four connections are shown between first output ports 34 and the USB hub switch module 32, but this is by way of example only. The number of connections will equal the number of computer systems 12 for which the signal switch 10 is configured.

Likewise, in FIG. 4, two connections are shown between second output ports 36 and the USB hub switch module 32, but this is also by way of example only. The number of connections will equal the number of peripheral output ports for which the signal switch 10 is configured.

The USB hub switch module 32 is a bridge between peripheral devices 20 and computer systems 12 and allows the signal switch 10 to connect each of a plurality of computer systems to one or more than one peripheral device. Construction of a circuit suitable as a USB hub switch module is well known in the art with reference to this disclosure. In one preferred embodiment, the USB hub switch module includes 4 USB hubs and matrix analog switches which are controlled by CPU firmware. Texas Instruments® manufactures USB Hub chips that are suitable for this module, and the module can be constructed using Application Specific Integrated Circuit (ASIC) design methodology.

A USB device control module 38 for controlling signals is connected to the CPU 30 and the USB HUB switch module 32. The USB device control module 38 comprises USB device chips that are used to emulate the console devices, such as first keyboard 16 and first mouse 18, for the first output ports 34. In other words, by having a USB device chip emulate console devices attached to a first computer system, actual console devices may be switched to a second or different computer system, leaving any channels between the first computer system and peripherals connected, any data flow in such channels uninterrupted, and the first computer system still processing as if the actual console devices, now emulated, were still connected. These chips are controlled by CPU 30 firmware. One device chip is required for each computer system 12. Construction of a circuit suitable as a USB device control module is well known in the art with reference to this disclosure.

In FIG. 4, four connections are shown between the USB device control module 38 and the USB hub switch module 32, but this is by way of example only. The number of connections will equal the number of computer systems 12 for which the signal switch 10 is configured. In one preferred embodiment, the USB device control module includes 4 USB device chips and the chips are also controlled by CPU firmware. Philips Semiconductors® makes chips suitable for use in this module, and the module may also be constructed using Application Specific Integrated Circuit (ASIC) design methodology.

Figure 5:
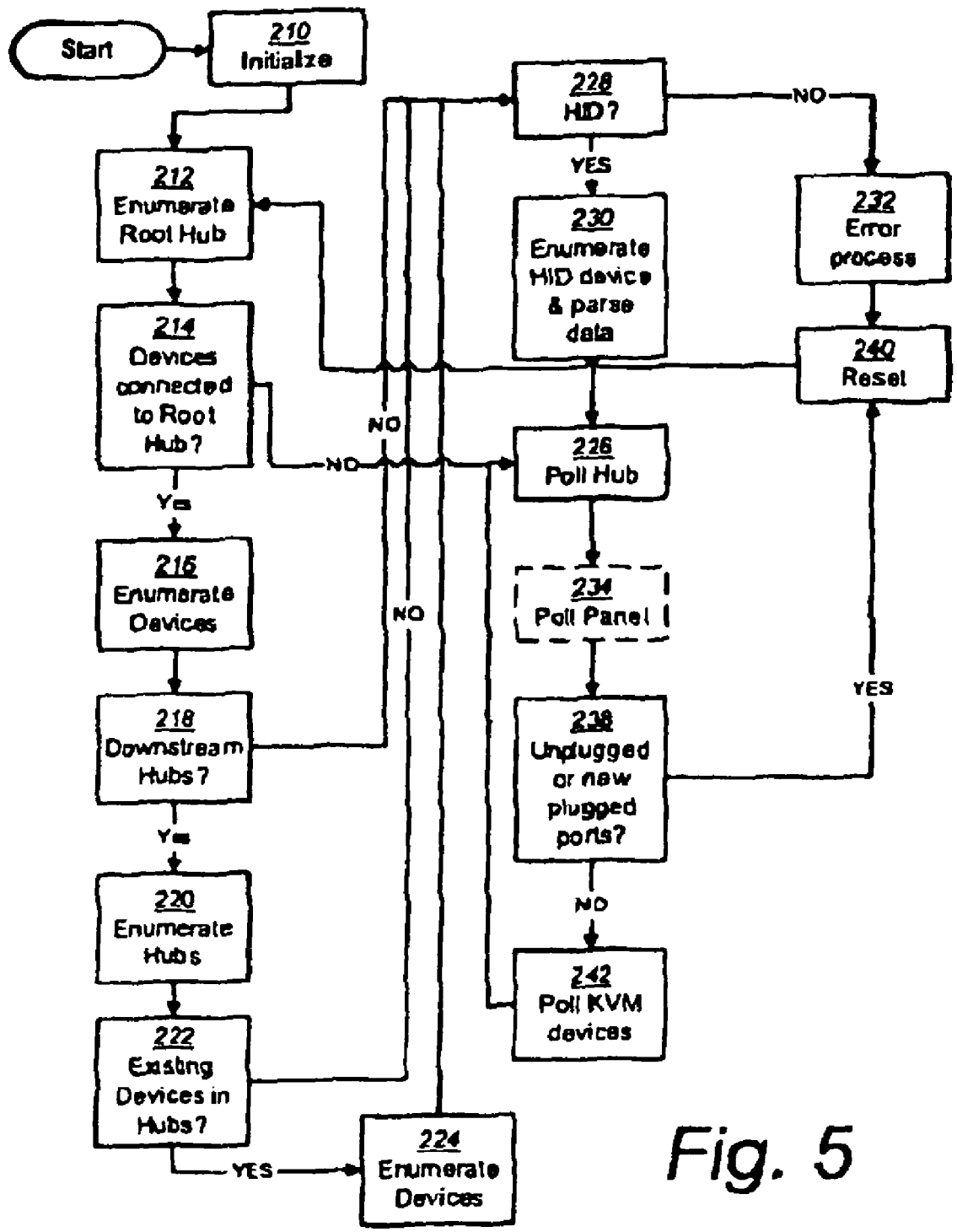
FIG. 5 is a function block diagram of process useable as a management control program for the signal switch of FIG. 4.

Referring to FIG. 4, the CPU 30 comprises a first memory 40 for storing a management program 42 for managing the operation of the signal switch 10. A flowchart of the function of a portion of management program 42 suitable for use in the present invention is illustrated in FIG. 5, and described below.

A USB host control module 44 is configured to communicate with a plurality of console devices and is connected to the CPU 30. Construction of a circuit suitable as a USB host control module is well known in the art with reference to this disclosure. The USB host control module 44 itself comprises a root hub 46 for communicating with one or more than one console devices or downstream hubs, through third output ports 48. The root hub is a USB compatible hub, which is well known in the art with reference to this disclosure.

As shown in FIG. 3, one or more than one downstream hub may be connected to the signal switch 10, such as first downstream hub 171 and second downstream hub 172, communicating with root hub 46 through one of the third output ports 48. It is possible to daisy chain up to 127 devices by adding more downstream hubs.

Typically, third output ports 48 comprise two physical ports. Optionally, in a different embodiment, an Internal additional console USB hub (not shown) may be connected to the root hub 46 for increasing the number of third output ports 48 available for connecting console devices. The CPU 30 firmware has the ability to handle hub functions. Construction of firmware suitable to run the CPU according to the method disclosed herein is known in the art with reference to this disclosure.

An optional video/panel control device module 50 is connected to the CPU 30 for communicating with a variety of optional panel display devices 54 (shown in broken lines), such as light panels, LEDs, buttons, video controller switches, or other optional panel devices. If an on screen display ("OSD") function is provided, then an optional OSD control device module 56 (shown in broken lines) is connected to the CPU 30 and the video/panel control device module 50 for controlling and adjusting signals to an external monitor 14 through fourth output port 52. Construction of circuits suitable for use as a video/panel control device module or optional OSD control device module is known in the art with reference to this disclosure.

With reference to FIG. 5, the process of a portion of a management program 42 suitable for use in the present invention may proceed as follows. In step 210 the signal switch 10 is initialized. In step 212, a root hub 46 is enumerated and any root hub message from the root hub 46 is saved. In step 214 it is determined whether any device is connected to the root hub 46. If a device is determined to be connected to the root hub 46, program process passes to step 216, else the process passes to step 226.

In step 216, each device determined to be connected to the root hub 46 is enumerated, and a device message from the USB device determined to be connected to the root hub 46 is parsed and saved in a suitable memory.

Next, in step 218, it is determined whether any downstream hub is connected to the root hub 46. If no downstream hub is determined to be connected to the root hub 46, the process proceeds to step 228. If a downstream hub is detected, the process passes to step 220. In step 220 each downstream hub determined to be connected to the root hub 46 is enumerated and a downstream port status of the hub is received. The process then proceeds to step 222.

In step 222, it is determined whether any device is existing in a port of the downstream hub. If no device is determined to be existing in a port of the downstream hub, the process proceeds to step 228. If, in step 222, a device is determined to be existing in a port of a downstream hub, the process proceeds to step 224 where each such device is enumerated and a connecting device message is parsed and saved in a suitable memory. The process then proceeds to step 228.

In step 228, it is determined whether the connected device is a HID keyboard or mouse or other HID compliant device. As will be evident to those skilled in the art with reference to this disclosure, this step could test for compliance with any desired industry standard or device class. If the connected device is not such a device, the process proceeds to step 232 which is an error process which results in resetting a HOST control RAM in step 240. If the connected device is determined to be complaint, then In the next step 230, each such connected device is enumerated and its report data is parsed. The reason for the compliance test is that the switch has been constructed to emulate certain console devices which comply with an industry standard device class.

Control then passes to step 226 where the HUB switch module 32 is polled. In optional step 234 any panel or LED circuit is polled. In step 238 it is determined whether any downstream port is unplugged or plugged. If the downstream port is unplugged or plugged the process proceeds to step 240 where the HOST control RAM is reset. After resetting the HOST control RAM in step 240 the process returns to step 212. Else, the process proceeds to step 242 where the KVM devices are polled and the process returns to step 234.

The firmware controls the USB console devices and PC console device emulations. It is not necessary to control the USB peripherals, since the invention generates a path or channel between the USB peripherals and the linked PCs which is undisturbed by switching the channels between the complaint KM devices and the PCs.

Those skilled in the art with reference to this disclosure will be able to construct a USB emulation program suitable for use in the present invention by following the human interface device (HID) specification. The HID specification defines a quasi-language for the HID-compliant USB device to tell the host how to interpret the data that the host receives. This quasi-language is flexible and permits many ways to describe the same piece of functionality. The invention will be useable with other industry standard specifications that define a procedure to tell a host how to interpret the data that the host receives from a standards-compliant device.

Currently, a Device Class Definition for Human Interface Devices (HID) Firmware Specification-Jun. 27, 2001, Version 1.11, is available at http://www.usb.org/developers/data/devclass/HID1.sub.--11.pdf and is incorporated herein. The most current version of the specification and other HID related information is maintained at http://www.usb.org/developers/hidpage.html.

Using a bus analyzer, such as one available currently from Computer Access Technology Corp. it is possible to read the USB bus and analyze the data packets coming from a keyboard and a mouse. The HID specification provides interpretation of the packet meaning. By providing that all the console devices be complaint with the HID specification, or some future standard specification, it is only necessary to emulate such HID or standards-compliant devices.

In a preferred embodiment the whole system programs, which include USB Hub switch control, USB device chip control (device emulation) and console device emulation (Host emulation) are all built in a CPU chip (Flash ROM or PROM). One skilled art with reference to this disclosure and following the referenced specifications will be able to write a USB emulation program suitable to make a switch appear as a PC to peripheral devices, and enable the switch to communicate with USB devices or USB PCs at the same time.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. It should be appreciated that the present invention should not be construed as limited by such embodiments, but rather construed according to the below claims.

What is claimed is:

1. A signal switch for sharing a video monitor, console devices including a mouse and a keyboard, compliant with an industry standard and one or more than one peripheral device in any of a plurality of computer systems, comprising:
a CPU for managing the signal switch;
a hub switch module connected to the CPU and configured to communicate with any of the plurality of computer systems, and the one or more than one peripheral device,
a device control module for emulating the console devices according to the industry standard, connected to the CPU and the hub switch module;
a host control module connected to the CPU and configured to communicate with the plurality of console devices; and
a video control module connected to the CPU and configured to communicate with the video monitor;
wherein a communication link between the one or more peripheral devices and one of the plurality of computer systems can be maintained even while between the console devices and another one of the plurality of computer systems is established.

2. The signal switch of claim 1, wherein the hub-switch module comprises at least one hub.

3. The signal switch of claim 1, wherein the switching circuit comprises at least one switch.

4. A signal switch for sharing one or more console devices and one or more peripheral devices in any of a plurality of computer systems, wherein each console device includes a keyboard, a monitor and a mouse, the signal switch comprising:
a first channel for connecting a selected console device from the one or more console devices to a first selected computer system from the plurality of computer systems;
a second channel connecting the first selected computer system to a selected peripheral device from the one or more peripheral devices;
a third channel for connecting the selected console device to a second selected computer system from the plurality of computer systems; and
a switching circuit configured to switch the selected console device between the first channel and the third channel without changing the second channel connecting the first selected computer system and the selected peripheral device.

5. The signal switch of claim 4, wherein the one or more peripheral devices include an audio device.

6. The signal switch of claim 4, wherein the one or more selected peripheral device includes USB (Universal Serial Bus) device.

7. The signal switch of claim 4, further comprising a device control module connected to the switching circuit for emulating the console devices according to an industry standard.

8. The signal switch of claim 4, wherein the selected peripheral device is an audio device.

9. The signal switch of claim 4, wherein the selected peripheral device is a USB device.

10. The signal switch of claim 4, wherein the switching circuit comprises at least one hub.

11. The signal switch of claim 4, wherein the switching circuit comprises at least one switch.

12. The signal switch of claim 7, wherein the device control module emulates the selected console device for the first selected computer system when the switching circuit switches the selected console device from the first channel to the third channel.

13. The signal switch of claim 7, further comprising a CPU for managing the signal switch, wherein the CPU is connected to the switching circuit and the device control module.

14. A signal switch for sharing one or more console devices and one or more peripheral devices in any of a plurality of computer systems, the signal switch comprising:
a first channel for connecting a selected console device from the one or more console devices to a first selected computer system from the plurality of computer systems;
a second channel connecting the first selected computer system to a selected peripheral device from the one or more peripheral devices, the second channel having a data flow between the first selected computer system and the selected peripheral device;

a third channel for connecting the selected console device to a second selected computer system from the plurality of computer systems; and a switching circuit configured to switch the selected console device between the first channel and the third channel without interruption of the data flow through the second channel between the first selected computer system and the selected peripheral device.

15. The signal switch of claim 14, wherein the one or more peripheral devices include an audio device.

16. The signal switch of claim 14, wherein the selected peripheral device is an audio device.

17. The signal switch of claim 14, wherein the one or more peripheral devices include a USB device.

18. The signal switch of claim 14, further comprising a device control module connected to the switching circuit for emulating the console devices according to an industry standard.

19. The signal switch of claim 14, wherein the one or more console devices includes a keyboard, a monitor and a mouse.

20. The signal switch of claim 14, wherein the selected peripheral device is a USB device.

21. The signal switch of claim 18, wherein the device control module emulates the selected console device for the first selected computer system when the switching circuit switches the selected console device from the first channel to the third channel.

22. The signal switch of claim 18, further comprising a CPU for managing the signal switch, wherein the CPU is connected to the switching circuit and the device control module.

23. A signal switch for sharing a set of console devices and one or more peripheral devices in any of a plurality of computer systems, comprising:

a first channel for connecting a first console device selected from the set of console devices to a first selected computer system selected from the plurality of computer systems;

a second channel for connecting the first selected computer system to a selected peripheral device selected from the one or more peripheral devices;

a third channel for connecting the first console device to a second selected computer system selected from the plurality of computer systems;

a fourth channel for connecting a second console device selected from the set of console devices to the first selected computer system;

a fifth channel for connecting the second console device to the second selected computer system; and a switching circuit for switching the set of console devices from the fourth channel to the fifth channel without interrupting data flow of the first channel and the second channel.

24. The signal switch of claim 23, wherein the first console device is a keyboard and the second console devices is a mouse.

25. The signal switch of claim 23, wherein the first console device is a mouse and the second console devices is a keyboard.

26. The signal switch of claim 24, wherein the set of console devices further comprise a third console device.

27. The signal switch of claim 24, wherein the third console device is a monitor.

* * * * *